H. C. VIAL.
ROTATIVE RUBBING DEVICE.
APPLICATION FILED DEC. 17, 1906.

908,172.

Patented Dec. 29, 1908.
2 SHEETS—SHEET 1.

Witnesses:

Inventor:
Hippolyte Claude Vial

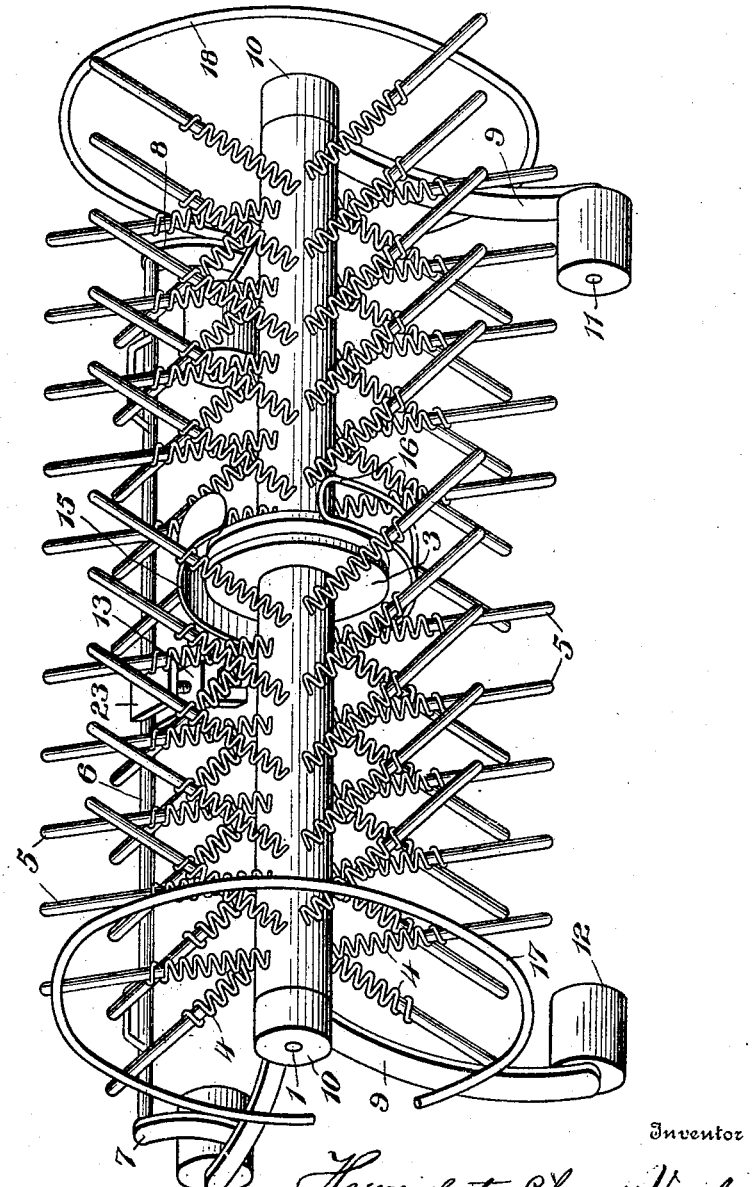

UNITED STATES PATENT OFFICE.

HIPPOLYTE CLAUDE VIAL, OF BOURGOIN, ISÈRE, FRANCE.

ROTATIVE RUBBING DEVICE.

No. 908,172.

Specification of Letters Patent.

Patented Dec. 29, 1908.

Application filed December 17, 1906. Serial No. 348,372.

*To all whom it may concern:*

Be it known that I, HIPPOLYTE CLAUDE VIAL, a citizen of the French Republic, and resident of Bourgoin, Isère, France, have invented certain new and useful Improvements in Rotative Rubbing Devices, of which the following is a full, clear, and exact specification.

This invention has reference to a device for easily rubbing the human body through a circular continuous motion upon the various parts of the body, especially on the dorsal parts.

The invention resides in the particular construction and combination of parts hereinafter described and claimed.

The invention is clearly illustrated in the accompanying drawings, in which—

Figure 1:
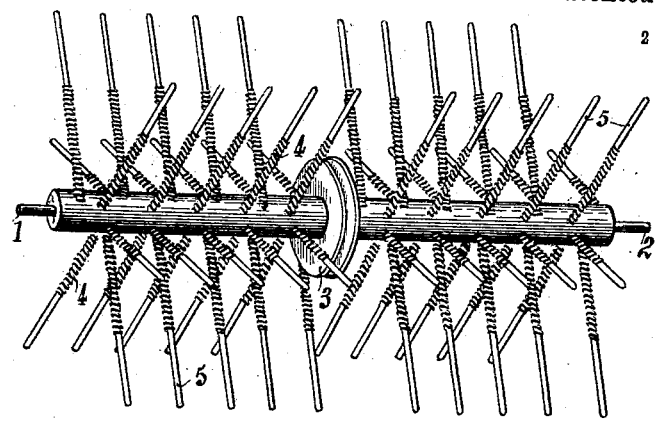
Figure 2:
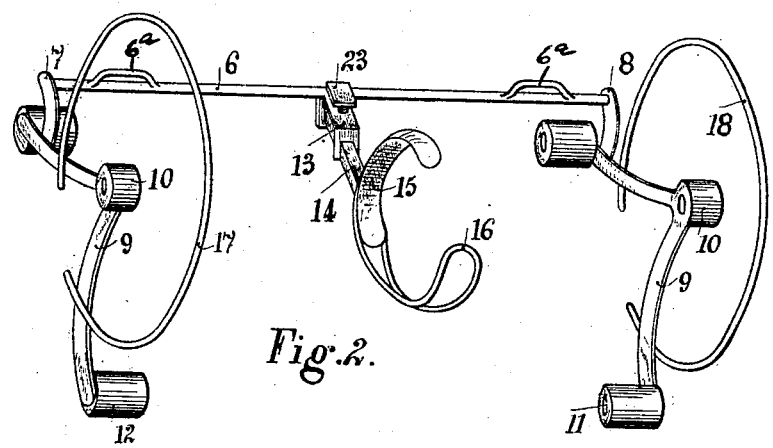
Figure 3:
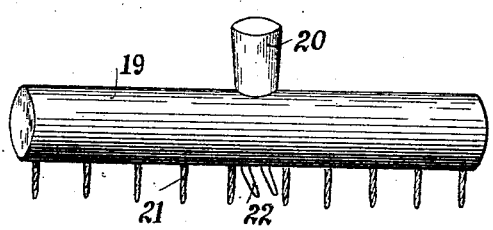

Figure 1 is a perspective view of the rubber alone. Fig. 2 a perspective view of the support of the same. Fig. 3 a view of a detached part. Fig. 4 an enlarged perspective detail showing the rubber in its supporter.

Referring now to Figs. 1, 2 and 3, it will be seen that the rubber embodies a shaft, the ends 1 and 2 of which are formed with trunnions, and the middle part, through a hollow cylinder perforated on its surface such perforations being arranged symmetrically except on the middle part which carries a grooved pulley 3. In these holes are spiral springs 4 fitted perpendicularly to the axle, the free ends of which carry india rubber sticks 5. Such rubber is carried by a spring made of a stem 6, the ends 7 and 8 of which are fixed at right angles to two parallel pieces 9 provided with heads 10 having openings to receive the trunnion of the rubber, the free ends of the pieces 9 are each provided with inwardly projecting studs 11 parallel to the stem 6 and which carry rollers 12; the rollers, while facilitating the motion of the rubber serve to keep the latter at a normal distance from the surface whereon it is acting. Besides, near the ends 7 and 8 of the stem 6 are arranged eyes 6ᵃ to which may be attached straps by which the rubber is moved when the device is to be used without the attendance of anybody.

The stem 6 carries in the middle a piece 13 in which may slide and to which may be fixed by means of a screw 23, a rod 14 ending with a curve 15 surrounding the free part of the pulley 3, thus preventing the belt from slipping off the pulley; two curved branches 16 attached to the bases of the arc 15 between which pass the members of the belt, to prevent contact of the springs of the rubber, the getting out of shape of the latter being also prevented by the circles 17—18 which are fixed parallel at each side of the parts 9.

For wet rubbings the apparatus is completed by a piece illustrated in Fig. 3, made of a hollow cylinder 19 closed at both ends, carrying a branch tube 20, and the lower part of which is provided with holes fitted with cylindrical wicks 21 which allow of the dropping of the liquid introduced through the branch tube into the apparatus; this cylinder 19 is placed on the rod 6 by means of a fork 22 which is pushed under the screwhead 23.

The controlling of the apparatus by means of an elastic belt is indispensable as it is most important to operate the same without moving the body thereof to reach the various parts to be rubbed. For the dorsal rubbing for example, the rubber is moved about 24 inches to cover the vertebral column downwards, from up and down.

Having thus described my invention, what I claim is:

1. A rubber for a rotating rubbing device, comprising a rotary shaft with trunnions, spiral springs radiating from said shaft, india rubber sticks at the outer ends of said springs, a pulley on said shaft for coöperation with an extensible belt, combined with a support in which said shaft is rotatably mounted.

2. In a device of the character described, a support comprising a stem with right angled portions at its ends, legs carried thereby and having heads adapted to receive the shaft of a rubber and rollers carried at the free end of said legs and a rubber having a shaft adapted to be mounted in said head and provided with radiating spiral springs and india rubber sticks at their outer ends.

3. In a device of the character described, a support comprising a stem with right angled portions at its ends, legs carried thereby and having heads adapted to receive the shaft of a rubber, rollers carried at the free ends of said legs and a rubber having a shaft adapted to be mounted in said heads and provided with radiating spiral springs and india rubber sticks at their outer ends and guards 17—18 secured to said legs.

4. In a device of the character described, a support comprising a stem with right angled portions at its ends, legs carried thereby and having heads adapted to receive the shaft of a rubber, rollers carried at the free ends of said legs, and a rubber having a shaft adapted to be mounted in said heads, guards 17, 18 secured to said legs, a belt guard detachably secured to said stem, and radiating spiral springs on said shaft and india rubber sticks at the outer ends of said springs.

5. In a device of the class described, a support for a rubber, the same comprising a stem provided with eyes, right angled portions at the end of said stem, angular arms provided with heads at their junction and inwardly projecting studs at their ends, a member slidable on said stem, said member terminating in a curved portion one end of which has curved branches, combined with a rubber rotatably mounted in said support.

In testimony whereof I affix my signature.

HIPPOLYTE CLAUDE VIAL.

In the presence of—
  MARIN VACHON,
  PIERRE COTTE.